(12) United States Patent
Rhoades

(10) Patent No.: US 10,402,957 B2
(45) Date of Patent: Sep. 3, 2019

(54) EXAMINING DEFECTS

(71) Applicant: PRE-CHASM RESEARCH LIMITED, Hale Cheshire (GB)

(72) Inventor: Anthony Rhoades, Cheshire (GB)

(73) Assignee: Pre-Chasm Research Limited, Cheshire (GB)

( * ) Notice: Subject to any disclaimer, the term of this patent is extended or adjusted under 35 U.S.C. 154(b) by 164 days.

(21) Appl. No.: 15/311,394

(22) PCT Filed: May 18, 2015

(86) PCT No.: PCT/GB2015/051454
§ 371 (c)(1),
(2) Date: Nov. 15, 2016

(87) PCT Pub. No.: WO2015/173594
PCT Pub. Date: Nov. 19, 2015

(65) Prior Publication Data
US 2017/0084015 A1 Mar. 23, 2017

(30) Foreign Application Priority Data
May 16, 2014 (GB) .................. 1408757.1

(51) Int. Cl.
*G06T 7/00* (2017.01)
*H04N 1/00* (2006.01)

(52) U.S. Cl.
CPC ....... *G06T 7/0002* (2013.01); *H04N 1/00307* (2013.01); *G06K 2209/19* (2013.01); *G06T 2207/10004* (2013.01)

(58) Field of Classification Search
CPC ........ G06T 7/0002; G06T 2207/10004; H04N 1/00307; G06K 2209/19
See application file for complete search history.

(56) References Cited

U.S. PATENT DOCUMENTS

| | | | | |
|---|---|---|---|---|
| 6,437,357 B1* | 8/2002 | Weiss | ................... | G01N 21/896 250/223 R |
| 6,470,303 B2* | 10/2002 | Kidd | ...................... | G06Q 99/00 702/33 |
| 6,501,546 B1* | 12/2002 | Weiss | ................... | G01N 21/958 356/239.1 |
| 7,487,018 B2* | 2/2009 | Afshar | ................... | G06Q 10/06 701/29.6 |

(Continued)

FOREIGN PATENT DOCUMENTS

GB 2415776 1/2006

OTHER PUBLICATIONS

Pronk et al., 2001, Monash University Accident Research Center Publication, "Windscreen and Safety: A Review".*

(Continued)

*Primary Examiner* — Manav Seth
(74) *Attorney, Agent, or Firm* — Hartman Global IP Law; Gary M. Hartman; Domenica N. S. Hartman

(57) ABSTRACT

A method of analyzing a defect comprising analyzing a digital image of the defect on a portable device using software contained in the device or an associated processor by virtue of a downloaded app. The method can be used for glass, for example, windscreen defects, in automobiles, for bodywork defects and for alloy wheel scuffs. The app can send details to a repair facility to get a quote for repair.

9 Claims, 3 Drawing Sheets

(56) References Cited

U.S. PATENT DOCUMENTS

| | | | | |
|---|---|---|---|---|
| 7,697,054 B2* | 4/2010 | Cazier | | H04N 5/23293 345/619 |
| 7,995,798 B2* | 8/2011 | Krupnik | | A61B 1/00096 382/106 |
| 8,019,629 B1* | 9/2011 | Medina, III | | G06Q 40/08 705/4 |
| 8,230,362 B2* | 7/2012 | Couch | | G01M 17/00 715/852 |
| 8,510,196 B1* | 8/2013 | Brandmaier | | G06Q 40/08 705/35 |
| 8,730,183 B2* | 5/2014 | Lundback | | G06F 3/0416 345/156 |
| 9,189,960 B2* | 11/2015 | Couch | | G08G 1/168 |
| 9,407,874 B2* | 8/2016 | Laurentino | | H04N 7/155 |
| 9,477,978 B1* | 10/2016 | Oakes, III | | G06Q 30/0613 |
| 9,616,851 B2* | 4/2017 | Halimeh | | B60S 1/0844 |
| 9,654,679 B1* | 5/2017 | Veliche | | H04N 5/23222 |
| 9,723,251 B2* | 8/2017 | Slotky | | H04N 5/23222 |
| 10,071,687 B2* | 9/2018 | Ihlenburg | | H04N 7/18 |
| 2002/0013685 A1* | 1/2002 | Kidd | | G06Q 99/00 703/8 |
| 2002/0055861 A1* | 5/2002 | King | | G06Q 10/10 705/4 |
| 2003/0233261 A1* | 12/2003 | Kawahara | | G06Q 10/10 705/4 |
| 2004/0117131 A1* | 6/2004 | Peters | | G06F 11/321 702/34 |
| 2005/0060179 A1* | 3/2005 | Tinberg | | G06Q 10/10 705/306 |
| 2007/0055420 A1* | 3/2007 | Krzystofczyk | | G07C 5/0808 701/31.8 |
| 2007/0200691 A1* | 8/2007 | Lam | | G07C 5/0891 340/436 |
| 2007/0250232 A1* | 10/2007 | Dourney, Jr. | | G06Q 99/00 701/33.4 |
| 2007/0288135 A1* | 12/2007 | Kidd | | G01C 11/06 701/31.4 |
| 2008/0235040 A1* | 9/2008 | Ratliff | | G06Q 10/06 705/1.1 |
| 2008/0267487 A1* | 10/2008 | Siri | | G06Q 10/087 382/141 |
| 2009/0138290 A1* | 5/2009 | Holden | | G06Q 10/087 705/4 |
| 2013/0317864 A1* | 11/2013 | Tofte | | G06Q 40/08 705/4 |
| 2014/0213936 A1* | 7/2014 | Monovoukas | | A61B 5/1075 600/587 |
| 2014/0241589 A1* | 8/2014 | Weber | | G06K 9/00791 382/108 |

OTHER PUBLICATIONS

Department of Transport (herein referred to as DOT), May 2010, "Stocker or other Obscurations in Front and Rear windscreens".*

American National Standard, 2007, "Repair of Laminated Automotive Glass Standard (ROLAGS)".*

Anonymous: "100+ Top Apps for Red Eye Remover (iPhone/iPad): AppCrawlr", Apr. 27, 2014; retrieved from Internet: URL: https://web.archive.org/web/20140427224614/http://apperawlr.com/ios-apps/bst-apps-red-eye-remover.

Anonymous: Die 65 bestenb Foto-Apps fur iPhone and iPad; p. 3; Dec. 27, 2012; retrieved from the Internet: URL: https://web.archive.org/web/20121227015456/http://t3n.de/news/65-besten-foto-apps-iphone-ipad-311617/3.

Anonymous: "How to remove redeye from photos on your iPhone or iPad: iMore"; Jul. 15, 2014; retrieved from the Internet: URL:https://web.archive.org/web/20140715045729/http://www.imore.com/how-remove-redeye-photos-your-iphone-or-ipad.

United Kingdom Examination Report dated Feb. 13, 2018.

* cited by examiner

EXAMINING DEFECTS

BACKGROUND OF THE INVENTION

This invention relates to examining defects, particularly defects that can be repaired, such as may appear on motor vehicles, and including windscreen chips, bodywork damage and scuffs to alloy wheels.

Windscreen defects in automobiles are usually initiated by a road chipping impact. Defects are of various types and occur in different locations on the windscreen. The type and location are important in determining whether, and in what way, the defect will develop, and this, in turn, is important in deciding whether and how urgently to seek remedial treatment, and even whether the vehicle is safe to drive.

Defects can also occur in side and rear windows.

Some defects are treatable, either to disguise them completely, and at least to stop them developing. Others are not, and require the glass to be replaced. Experts, providing repair and replacement services, can prescribe and carry out appropriate treatment usually by visual inspection. Vehicle owners or drives are not usually able to do this.

Bodywork defects can comprise dents of different sizes and severity that can be repaired by knocking out and perhaps painting, or scratches. Alloy wheels suffer scuffs and scratches that can also be repaired

BRIEF DESCRIPTION OF THE INVENTION

The present invention provides means to make an assessment of a defect, and to initiate a repair or replacement process.

The invention comprises broadly a method of analysing a defect comprising analysing a digital image of the defect on a portable device using software contained in the device or in an associated processor by virtue of a downloaded app.

The device may comprise a smartphone, which already has all the imaging, storage and processing power needed, and has the advantage that many people, and particularly many drivers and vehicle owners already possess one and need not purchase specialised equipment.

A smartphone may be used to form the image using a built-in camera, of which there are usually two, or may be used in conjunction with a near field communication equipped digital camera, which can form the image and transfer it to the smartphone.

The smartphone may comprise data processing facility, by virtue of the app, that carries out the analysis or it may transfer the image to an external processor equipped with an app for analysis and recording, and such external processor may copy the result of such analysis to the smartphone.

The image analysis may involve determination of features of the defect, such as, in the case of a glass defect, its size, shape and depth, its proximity to the edge of the glass, and, particularly in the case of a windscreen, its location in relation to the driver's line of vision.

Analysis of images taken at different times can indicate whether a defect is changing, a crack, for example, growing.

The analysis may assess a windscreen defect against one or more of the following criteria:
 will the defect not fit entirely within a circle of diameter 28 mm?
 is the edge of the circle less than 30 mm from the edge of the screen?
 does the defect fit entirely within a circle of diameter 10 mm and in the driver's line of vision?

The driver's line of vision may be taken to be an area 300 mm wide extending up the screen centred on the steering wheel.

If the answer to any of these questions is 'yes', then the defect cannot be safely repaired.

The app may include such functionality as will carry out the necessary image processing and assessment against the criteria and, on a determination that the defect is repairable, or that the glass should be replaced, communicate the same, with details of the vehicle, its location (which may be GPS-based), its insurer an any other relevant information, to a repair/replace service to initiate a call-out.

A bodywork defect can be assessed for its size, its location, whether paintwork is scratched, and whether metalwork is dented, torn or holed. A wheel scuff or scratch may be assessed primarily for size, a prime criterion for assessment of repair cost.

Assessment need not be entirely done by image processing and measurement—some user input may be called upon. For example, in assessing the length of a scuff or scratch on bodywork or an alloy wheel, the user may be asked to run a finger along the image displayed on the device touch screen. Software can then more easily compute the length of the feature knowing the scale of the image.

Methods of analysing defects according to the invention and systems for dealing with the same based on a smartphone app according to the invention will now be described with reference to the accompanying drawings, in which:

DETAILED DESCRIPTION OF THE INVENTION

The drawings illustrate apparatus used in a method of imaging and analysing a vehicle windscreen defect 11 comprising analysing a digital image of the defect 11 on a portable device 12 using software contained in the device 12 by virtue of a downloaded app.

The device 12 comprises a smartphone, which already has all the imaging, storage and processing power needed, and has the advantage that many people, and particularly many drivers and vehicle owners already possess one and need not purchase specialised equipment.

The smartphone 12 is used to form the image using a built-in camera, of which there are usually two, or may be used in conjunction with a near field communication equipped digital camera 13, which can form the image and transfer it to the smartphone 12.

Figure 4:
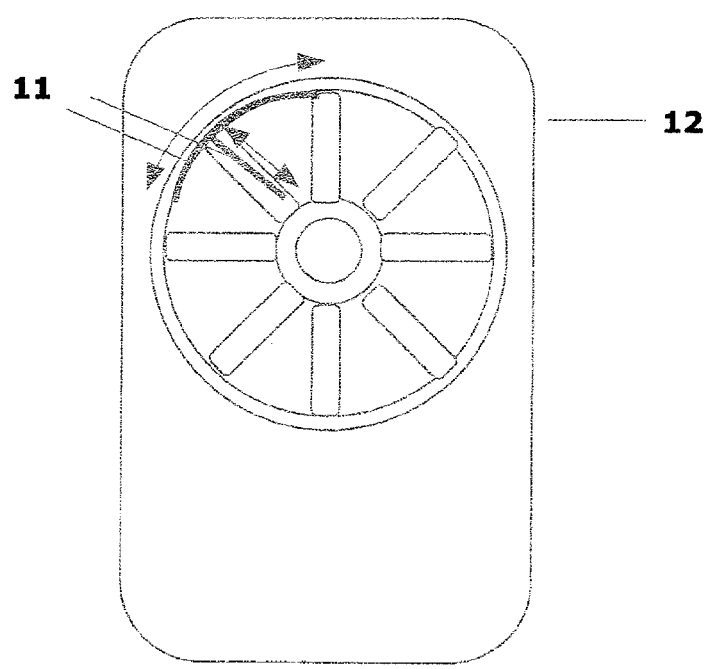
FIG. 4 is a view of a smartphone screen used in assessing an alloy wheel scuff.

To facilitate sizing the defect, the smartphone may first image an object of known size, such as a coin, placed next to the defect. For sizing an alloy wheel, as seen in FIG. 4, the user will position the camera so that the wheel image just fits in a guide circle drawn on the screen by the app, and the user will then be prompted to enter, via on-screen keyboard or keypad, the tyre size, from which the app software can scale the wheel image.

The smartphone 12 comprises data processing facility, by virtue of an app that carries out the analysis, but it may have just rudimentary functionality in capturing the image, transferring the image via the internet 14 to an external processor 15 for analysis and recording, and such external processor 15 will copy the result of such analysis to the smartphone 11.

Figure 1:
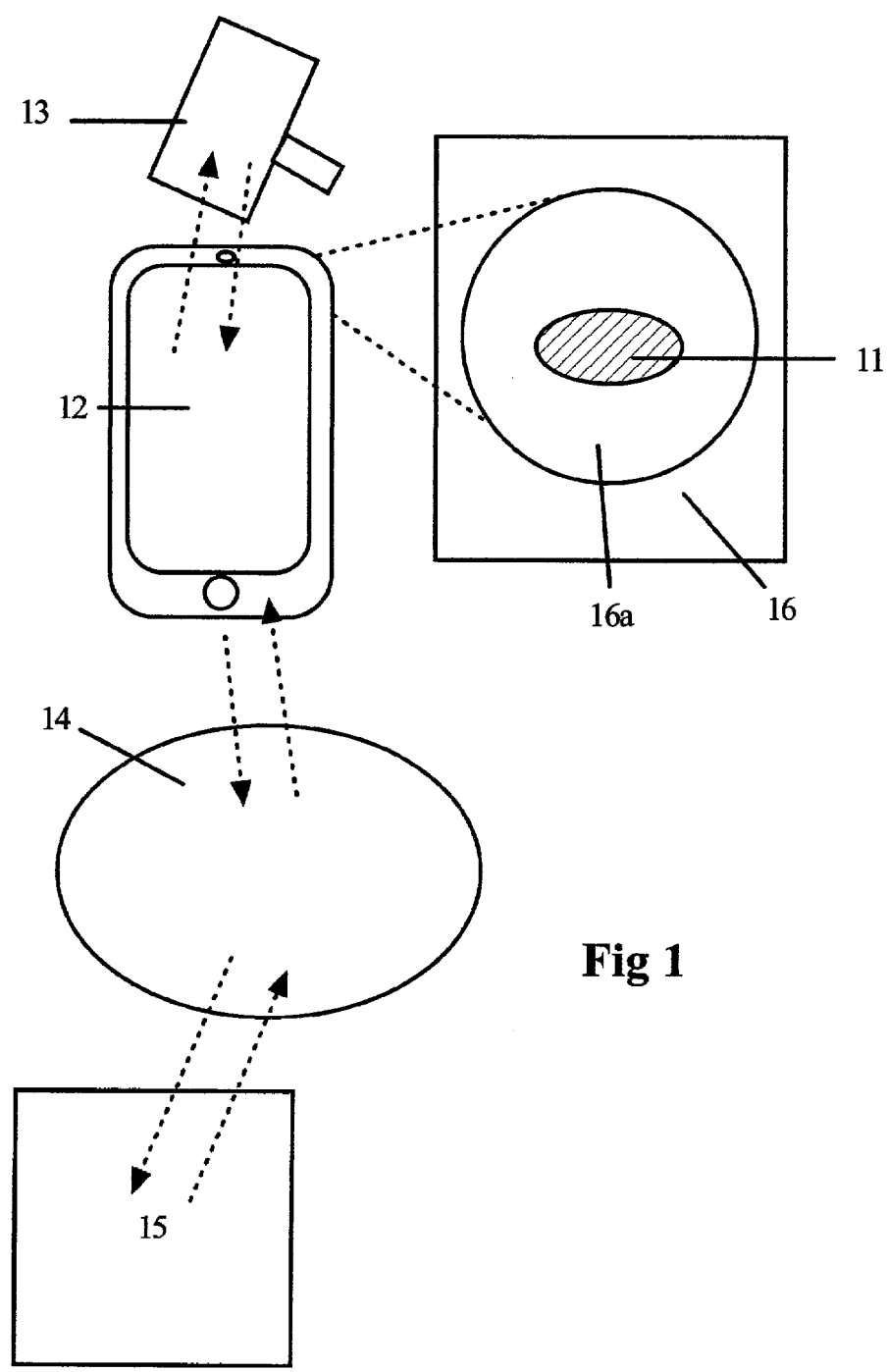
FIG. 1 is a diagrammatic representation of apparatus used in the analysis.
Figure 2:
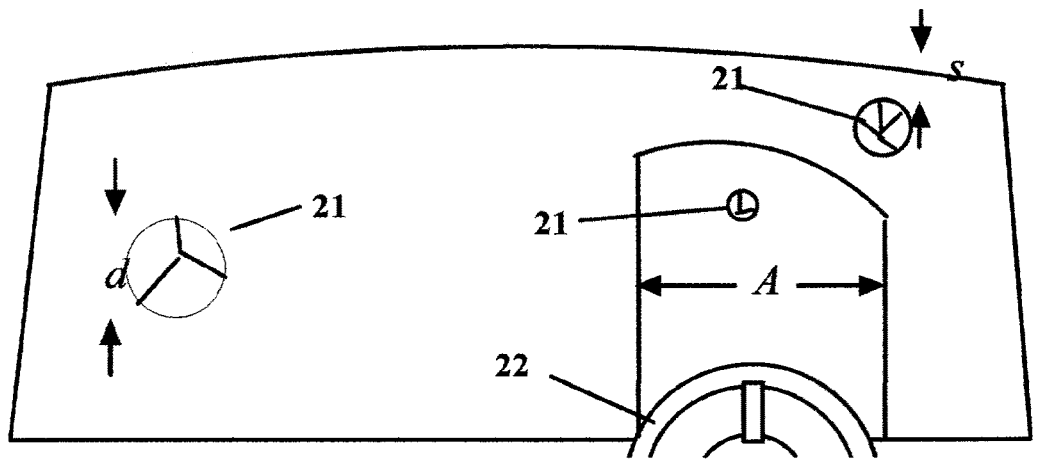
FIG. 2 is a view of a vehicle windscreen with chip defects.

The image analysis will, in the case of a chip 21 (FIG. 2), first determine the diameter d of the smallest circle that can be placed around the chip to completely contain it. If d is larger than 28 mm, the software will decide that the chip cannot be repaired. If d is 28 mm or less, the image analysis will measure the distance between the circle and the edge of the screen. If this distance is less than 30 mm, the software will decide that the chip cannot be repaired.

Finally, the image analysis will determine if the chip 21 is within an area A 300 mm wide extending up the screen centred on the steering wheel 22. This may require a second image including the steering wheel 22. If it is, it will then be decided if the circle containing the chip 21 is more than 10 mm in diameter. If it is, the software will decide that the chip cannot be repaired.

Figure 3:
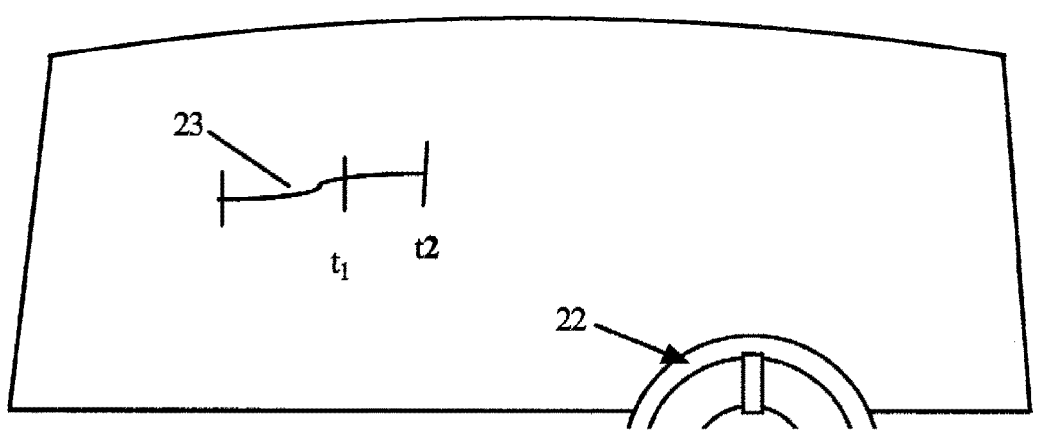
FIG. 3 is a view of a windscreen with a growing crack.

If the defect is a crack 23 (FIG. 3), rather than a chip, the image analysis may automatically switch to 'crack' mode, or the driver can select 'crack' from a crack or chip menu, and image the crack at a point $t_1$ in time. A second, later image, at time $t_2$, can then be compared with the first and the rate of crack propagation determined, which may give a time-before-failure indication.

FIG. 4 illustrates a simple way of determining defect size. Instead of image analysis software calculating defect dimensions, the user is invited to trace the defect 11 image on the smartphone touch screen using a finger or a tracer stylus, as indicated by the arrows. Software can readily determine the on-screen length over which the finger or stylus travels and scale that up.

Once image analysis and reparability determination is complete, the smartphone may then be instructed to call a local repair or replace facility and pass on its findings. Local repair facilities can be found by a GPS-inspired database search. A call out or a visit can then be arranged either by phone or text exchange. If a windscreen replacement is needed, a service vehicle may be equipped with the correct screen, as can be determined from vehicle details transmitted along with location, insurer details and any other relevant information.

The invention claimed is:

1. A method of analysing a glass defect in a glass window, the method comprising forming a digital image of the defect on a portable device and performing analysis of the digital image of the defect using software contained in the device, or in an associated processor by virtue of a downloaded app, wherein:
   the device comprises a smartphone and the digital image is formed using a built-in camera of the smartphone; and
   the analysis of the digital image comprises a determination of features of the defect that include size, shape and depth of the defect, and a determination of reparability of the defect that includes an assessment of proximity of the defect to an edge of the glass window and, when the glass window is a windscreen of a vehicle, an assessment of location of the defect in the windscreen in relation to a line of vision of a driver of the vehicle.

2. A method according to claim 1, further comprising forming the digital image in conjunction with a near field communication equipped digital camera.

3. A method according to claim 1, wherein the smartphone comprises a data processing facility, by virtue of the app, and the data processing facility carries out the analysis.

4. A method according to claim 1, further comprising transferring the digital image from the smartphone to an external processor that carries out the analysis, and the external processor records the digital image and copies results of the analysis to the smartphone.

5. A method according to claim 1, further comprising forming and analysis of a second digital image of the defect on the portable device to indicate whether the defect is changing.

6. A method according to claim 1, wherein the glass window is the windscreen and the analysis assesses the defect against one or more of the following criteria:
   does the defect not fit entirely within a circle of 28 mm diameter;
   is an edge of the circle less than 30 mm from the edge of the glass window;
   does the defect fit entirely within a second circle of diameter 10 mm and in the line of vision of the driver of the vehicle.

7. A method according to claim 6, further comprising performing with the app image processing and assessment against the criteria and, on the determination that the defect is repairable, or that the glass window should be replaced, communicating the determination with details of the vehicle and location and insurer of the vehicle to a repair/replace service to initiate a call-out.

8. A method according to claim 1, wherein the determination of features of the defect comprises assessing the size of the defect from a touch screen image on the smartphone by tracing the digital image with a finger or a tracer stylus.

9. A method of analysing a glass defect in a glass window, the method comprising:
   forming a digital image of the defect with a built-in camera of a smartphone;
   displaying the digital image on a touch screen of the smartphone; and
   performing analysis of the digital image displayed on the touch screen using software contained in the device or in an associated processor by virtue of a downloaded app, wherein the analysis of the digital image comprises:
   a determination of features of the defect that include size, shape and depth of the defect, the size of the defect being determined by determining a diameter of a smallest circle that can be placed around the defect on the touchscreen to completely contain the defect; and
   a determination of reparability of the defect that includes an assessment of proximity of the defect to an edge of the glass window; and
   if the glass window is a windscreen of a vehicle, the determination of reparability of the defect further includes an assessment of location of the defect in the windscreen in relation to a line of vision of a driver of the vehicle.

* * * * *